(12) United States Patent
Lehtinen

(10) Patent No.: US 6,757,540 B1
(45) Date of Patent: Jun. 29, 2004

(54) METHOD AND SYSTEM FOR CONTROLLING CELLULAR NETWORK PARAMETERS

(75) Inventor: Joni Lehtinen, Tampere (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/486,219

(22) PCT Filed: Jun. 22, 1999

(86) PCT No.: PCT/FI99/00552

§ 371 (c)(1),
(2), (4) Date: Feb. 24, 2000

(87) PCT Pub. No.: WO00/01182

PCT Pub. Date: Jan. 6, 2000

(30) Foreign Application Priority Data

Jun. 26, 1998 (FI) .................................................. 981484

(51) Int. Cl.$^7$ ................................................. H04Q 7/20
(52) U.S. Cl. ........................ 455/446; 455/450; 455/423
(58) Field of Search ............................. 455/446, 421.1, 455/423, 450

(56) References Cited

U.S. PATENT DOCUMENTS

| 5,533,047 A | | 7/1996 | Mourot et al. | |
|---|---|---|---|---|
| 5,619,503 A | * | 4/1997 | Dent | 370/330 |
| 5,802,473 A | * | 9/1998 | Rutledge et al. | 455/446 |
| 5,987,055 A | * | 11/1999 | Duque-Anton et al. | 375/130 |
| 5,987,328 A | * | 11/1999 | Ephremides et al. | 455/446 |

FOREIGN PATENT DOCUMENTS

| DE | 196 06 109 | 6/1996 |
|---|---|---|
| WO | 98/36597 | 8/1998 |

* cited by examiner

*Primary Examiner*—Vivian Chin
*Assistant Examiner*—Lewis West
(74) *Attorney, Agent, or Firm*—Pillsbury Winthrop LLP

(57) ABSTRACT

The invention relates to a method for calculating a model to be used for controlling cellular network capacity and for facilitating the control of the capacity, the method comprising the generating of variable groups from cellular network variables and the determining of the interdependencies of the variable groups of the cellular network. The invention is characterized in that linear combinations dependent on each other are searched for in the variable groups, the dependence between the linear combinations and the strength of the dependence being measured by applying a canonical correlation coefficient; a multidimensional dependence between two variable groups in pairs being expressed in the method by only a few canonical variable pairs. Canonical correlation analysis facilitates the modelling of dependencies between large variable groups and the determining of the most important variables.

9 Claims, 2 Drawing Sheets

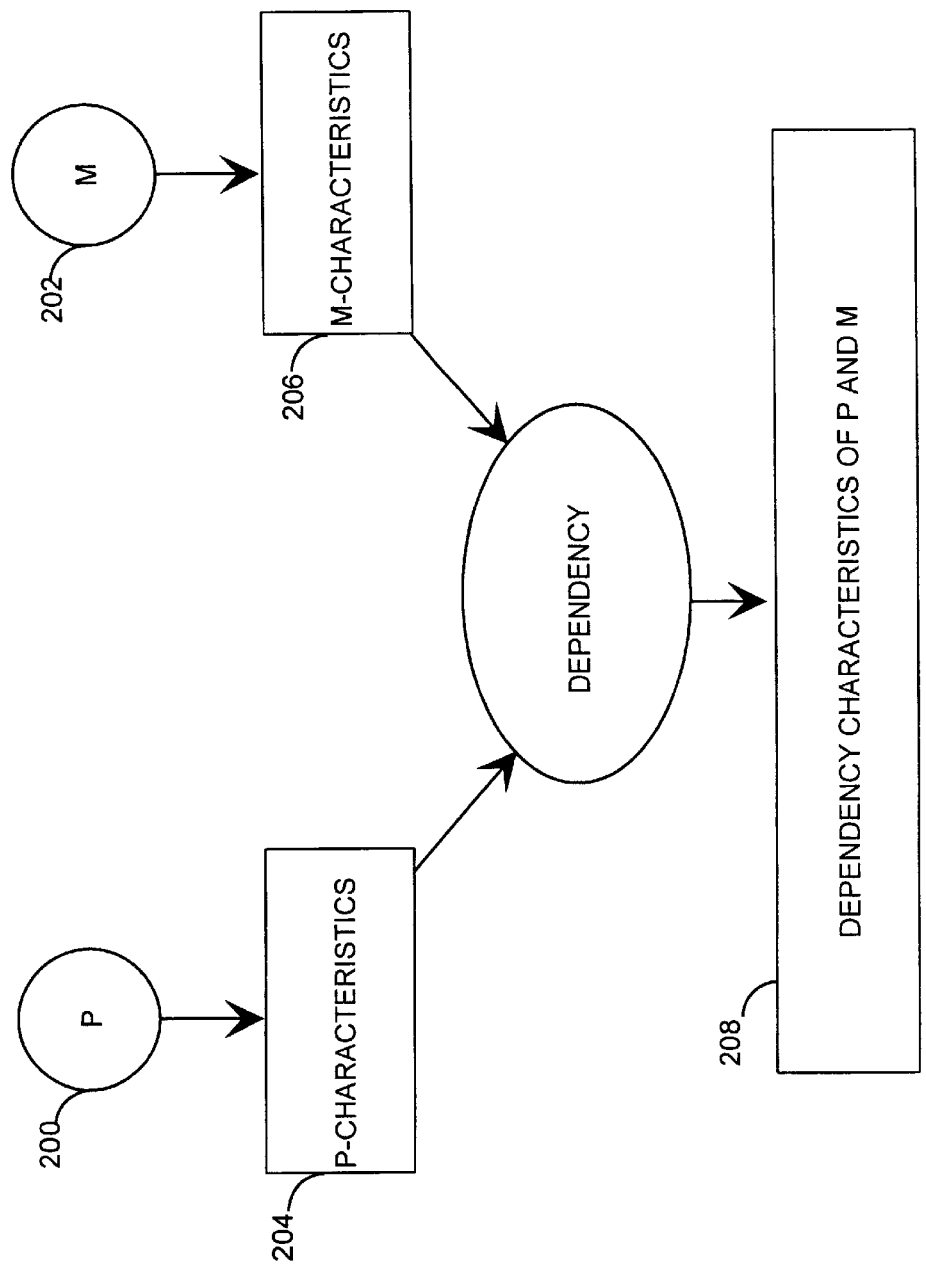

METHOD AND SYSTEM FOR CONTROLLING CELLULAR NETWORK PARAMETERS

FIELD OF THE INVENTION

The invention relates to the control and maintenance of Cellular Networks. The invention particularly relates to providing a model for controlling the capacity of a cellular network.

BACKGROUND OF THE INVENTION

For efficient management of cellular networks, several hundreds of parameters and the control of the parameter characteristics are needed. One of the reasons for problems in network control is lack of direct response, because the capacity of an entire cellular network is measured on the basis of about two thousand separate pieces of measurement data. Hence, effective cellular network control would require the monitoring of the impact of hundreds (about 300, for example) of parameters in hundreds (about 500, for example) of measurement results. In addition, the joint impact of the different parameters in the separate measurement results should be monitored, the level of difficulty of the task being comparable to a collective interpretation of a correlation matrix of about 300×500, for example. In other words, to change one cellular network parameter it would be necessary to always know which measurement results the change will affect and how much. Similarly, for obtaining a particular change in the measurement results, the, most important parameters for the change and their interdependence should be known.

Therefore problems related to network control may become too many and the demands they set may exceed human resources. Parameter changes and the information provided by the separate measurement results are therefore difficult to utilize when more effective means are searched for to manage the problems involved. Data measuring the network capacity is so abundantly available that solutions based on the data cannot made. A cellular network is complex and the data is spread into several applications. This is why there is a need for simple, effective solutions that take all cellular network systems into consideration as a whole.

BRIEF DESCRIPTION OF THE INVENTION

An object of the invention is therefore to provide a method allowing the above problems to be solved. This is achieved with a method for calculating a model to be used for controlling cellular network capacity and for facilitating the control of the capacity, the method comprising the generating of variable groups from cellular network variables and the determining of the interdependencies of the variable groups of the cellular network. The method is characterized by searching the variable groups for linear combinations dependent on each other, the dependence between the linear combinations and the strength of the dependence being measured by applying a canonical correlation coefficient, and by expressing a multidimensional dependence of two variable groups in pairs by using only a few canonical variable pairs.

The invention also relates to a system for calculating a model to be used for controlling the capacity of a cellular network and for facilitating the control of the capacity, the system being arranged to generate variable groups from cellular network variables and to determine interdependence of the variable groups of the cellular network. The system is characterized in that the system is arranged to search the variable groups for linear combinations dependent one each other, to measure the dependence between the linear combinations and the strength of the dependence by applying a canonical correlation coefficient, a multidimensional dependence of two variable groups in pairs being expressed in the system by using only a few canonical variable pairs.

The preferred embodiments of the invention are disclosed in the dependent claims.

The invention is based on using canonical correlation analysis to reduce the number of problems involved by expressing the interdependencies of two or more variable groups in a concise manner by using canonical variables as strongly dependent on each other as possible. Coefficients related to canonical variables can be utilized, for example, for determining the most important parameters and measurement results in interdependent variable groups.

The method and system of the invention provide several advantages. A canonical correlation analysis helps in the modelling of dependencies between large variable groups and in the determining of the most important variables. The method of analysis of the invention provides a clear solution for the utilization of the vast amounts of data in the cellular network. The method is particularly useful for those wishing to learn something about the interdependencies of parameters and about how the dependencies are connected to the capacity of the cellular network.

BRIEF DESCRIPTION OF THE DRAWINGS

In the following the invention will be described in greater detail in connection with preferred embodiments and with reference to the accompanying drawings, in which FIG. 2 illustrates, by way of example, interdependent parameter and audibility types found by applying canonical correlation analysis.

DETAILED DESCRIPTION OF THE INVENTION

Figure 1:
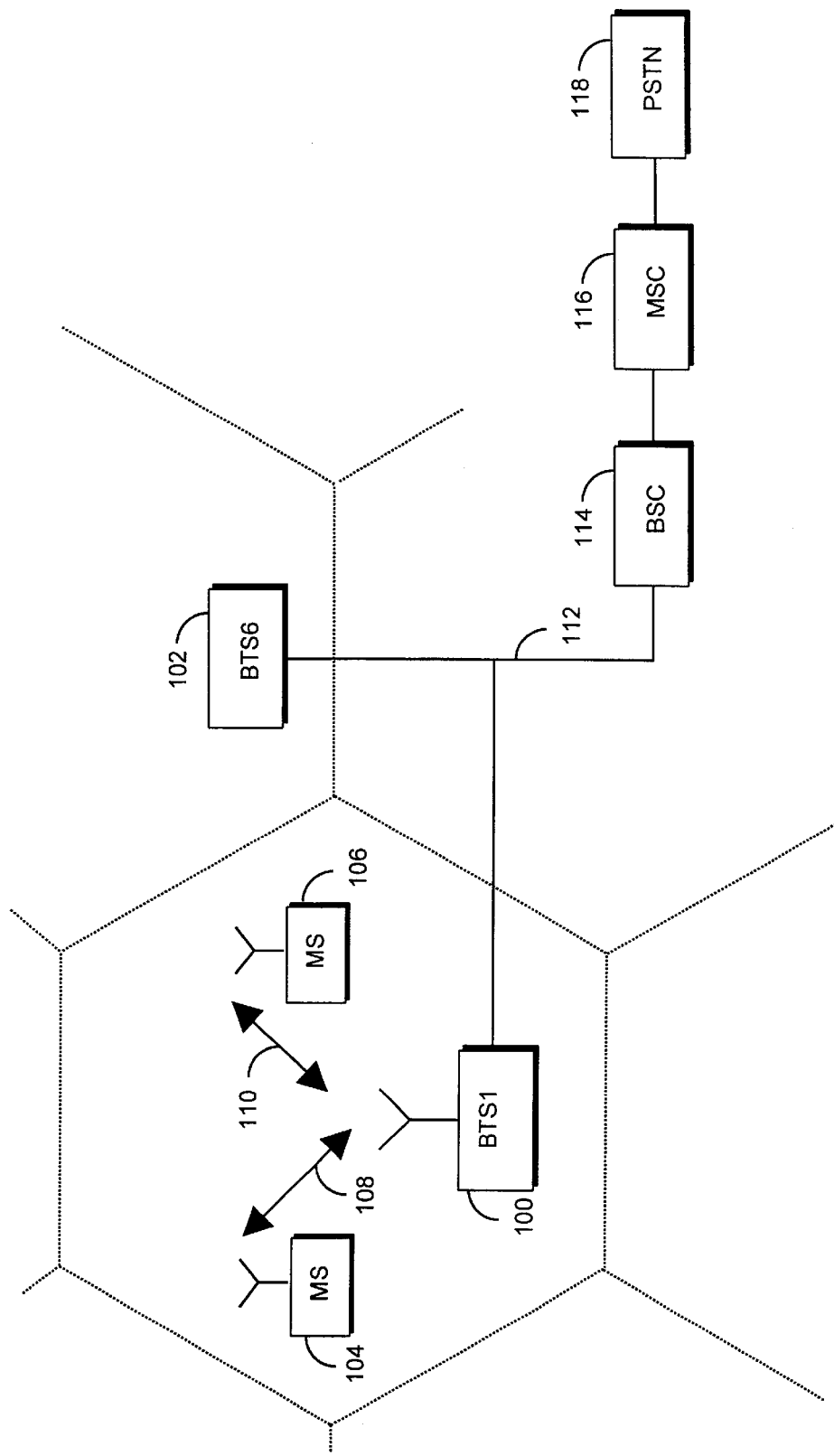
FIG. 1 illustrates a common cellular radio network where the invention can be applied.

FIG. 1 shows an example of a general cellular network structure. The service areas, i.e. cells, of base transceiver stations 100, 102 can be modelled as hexagons. Base transceiver stations 100, 102 are possibly connected to a base station controller 114 over a connecting line 112. The task of the base station controller 114 is to control the operation of several base transceiver stations 100, 102. Normally, a base station controller 114 has a connection to a mobile switching centre 116 which has a connection to a public telephone network 118. In office systems, the operations of a base transceiver station 100, a base station controller 114 and even a mobile switching centre 116 can be connected to one apparatus which then is connected to a public network 118, for instance to an exchange of the public network 118. Subscriber terminals 104, 106 in a cell have a bi-directional radio link 108, 110 to the base transceiver station 100 of the cell. In addition, the network part, i.e. the fixed part of the cellular radio network, can comprise additional base stations, base station controllers, transmission systems and network control systems of various levels. It is obvious to those skilled in the art that a cellular radio network also comprises many other structures which do not need to be described in this context.

Canonical correlation analysis is used for searching for interdependencies of two or more variable groups and for determining the strength of the interdependencies. In canonical correlation the variables in the groups are used to form separate linear combinations. The idea is to find first those linear combinations U and V of the variable groups that are as strongly dependent on each other as possible. This means that the coefficients appearing in the linear combinations U and V in question are selected so that the correlation between the variables U and V is as high as possible. The analysis provides a plural number of canonical variable pairs (U, V). If the number of explanatory variables $X^{(1)}$ is p and that of variable $X^{(2)}$ to be explained is q, the maximum number of canonical variable pairs is r=min(p, q). They are formed as linear combinations of the variables $X^{(1)}$ and $X^{(2)}$. The first linear combinations are formed by selecting the coefficients providing the highest possible correlation between the variables $U_{(1)}$ and $V_{(1)}$. The next step is to determine in the variable groups linear combinations $U_{(2)}$ and $V_{(2)}$ which are as dependent on each other as possible, but independent of the above determined linear combinations $U_{(1)}$ and $V_{(1)}$. In other words, the canonical variables $U_{(1)}$ and $V_{(1)}$ may not be correlated with the variables $U_{(2)}$ and $V_{(2)}$. The process continues until a variable pair $(U_r, V_r)$ is determined. The analysis produces r canonical variable pairs. The final number of the linear combinations naturally depends on the material to be observed, but in certain circumstances statistical significance can also be used as a criterion for elimination.

As stated above, the linear combinations are referred to as canonical variables, and their interdependence is measured by applying a canonical correlation coefficient. The maximizing task involved in the analysis aims at expressing multi-dimensional dependencies of two or more variable groups in a concise manner by using only a few canonical variable groups, the portion explaining total variance being the greatest in the linear combinations obtained first. Canonical variables can be interpreted as certain kinds of indexes where some variables may have a more central position than others. A plain text interpretation of the canonical variables is then obtained by naming the variables as parameter types or as measurement result types, for example, always according to their most important variables.

Canonical correlation can thus be understood as a multivariate regression of a multiple regression where the aim is to explain all the variables to be explained at the same time by applying a plural number of explanatory variables. FIG. 2 shows an example of the interdependencies of the measurement results of two canonical variables, i.e. a parameter type P, 200 and a measurement result type M, 202. A preferred embodiment of the canonical correlation analysis comprises interdependent parameter and audibility types such as those in FIG. 2. There are probably many similar pairwise interdependent types. Canonical variables calculated by applying canonical correlation analysis only maximize the interpretation of the correlations between the original variables.

In FIG. 2 symbol P denotes a value of a parameter type Power 200. The characteristics 204 of the parameter type 200 include for example the following. If a parameter coefficient is higher than the numerical value 0, the parameter is an essential one and the parameter increases the value of the type Power 200. The more the coefficient deviates from zero, the more essential the parameter is. Examples of such parameters could include Power Level parameter 1 with a coefficient 1.9, for example, and Power Level parameter 2 with a coefficient 1.1, for example. On the other hand, if the parameter coefficient is smaller than the numerical value 0, the increasing of the parameter in the type Power 200 decreases the value of the type (a parameter 3 with a coefficient –0.6, for example). Or, if the coefficient is 0, the changing of the parameter does not change the value of the type (a parameter R, for example). The same logic is also valid for a value M of Audibility range-interference type 202 shown in FIG. 2, the characteristics 206 of the value being the following: for example, the coefficient for audibility range is 2.3; the coefficient for interference is 1.1; the coefficient for a measurement result 3 is 0.3, and the coefficient for a measurement result Q is 0. In this case the parameters and the coefficients can naturally vary according to the example and the situation.

In the example of FIG. 2, the parameters P, 200 and M, 202 depend on each other. The dependence comprises the following characteristics 208: the random variables P and M with parameters 0 and 1 follow a normal distribution, i.e. P~N(0, 1) and M~N(0, 1), in other words, the distribution is standardized. The average of each variable is 0 and the variance is 1. Standardization changes the variance of each variable to an equal weight in contrary calculations. When the value of the Power type P increases, the value of the Audibility range-Interference type increases. When the coefficient of the parameter R is 0, the changing of the value of the parameter R does not change the value of the Audibility range-interference type. When the value of the Power type is increased, the audibility range and the interference increase.

A canonical correlation analysis most advantageously comprises the following steps:

1) The material to be observed, i.e. parameters p of explanatory variables and measurement results q of variables to be explained are arranged into the following matrix format:

$$\underset{(p+q)\times 22}{X} = \left(\frac{X^{(1)}}{X^{(2)}}\right) = \begin{pmatrix} x_{11} & x_{12} & \ldots & x_{1n} \\ x_{21} & x_{22} & \ldots & x_{2n} \\ \vdots & \vdots & \ddots & \vdots \\ x_{p1} & x_{p2} & \ldots & x_{pn} \\ \hline x_{11} & x_{12} & \ldots & x_{1q} \\ x_{21} & x_{22} & \ldots & x_{2q} \\ \vdots & \vdots & \ddots & \vdots \\ x_{q1} & x_{q2} & \ldots & x_{qn} \end{pmatrix},$$

where n denotes the number of observations in the material to be observed.

The transformations needed for variables having a distribution that deviates from the normal distribution can then be made. With the transformations it is possible to get closer to a multi-normal distribution, which is advantageous in view of the testing of the canonical correlations. The variables are then standardized and from there on the observations x are denoted with the letter z.

2) In the next step, correlations between all variables are calculated, advantageously Pearson or Spearman correlations, for example, or the like. The correlation matrix calculated between the variables can be divided into the following four submatrices:

$$R_{(p+q)\times(p+q)} = \begin{pmatrix} R_{11} & R_{12} \\ p\times p & p\times q \\ R_{21} & R_{22} \\ q\times p & q\times q \end{pmatrix}.$$

The upper left-hand corner of the division shows the internal correlations of a first variable group, i.e. explanatory variables $X^{(1)}$, and the lower right-hand corner shows the internal correlations of a second group, i.e. variables to be explained $X^{(2)}$. In addition, the matrix comprises the correlations of the variables in the variable groups with another variable group.

3) In the next step the usefulness of the canonical correlation analysis is tested by applying a Likelihood Ratio test, for example, or the like, to check whether the correlations between the variable groups at a particular risk level deviate from zero to a statistically significant extent, i.e. whether the the material to be observed is consistent with a distribution according to a zero hypothesis. In other words, it is tested whether even the first canonical correlation is statistically significant. The numerical values of the variable group in the upper right-hand corner and in the lower left-hand corner of the submatrix are the only ones that have an impact on the log-likelihood test quantity. The following zero hypothesis and alternative hypothesis are formed $$\begin{cases} H_0: \Sigma_{12} = R_{12} = 0 \\ H_1: \Sigma_{12} = R_{12} \neq 0 \end{cases}.$$

The matrix R(12) is a transpose of the matrix R(21), the matrix R(21) thus being tested at the same time. In this case the testing of the matrix R(12) is sufficient because if the result is 0 then all canonical correlations are also zeros.

The first step is to form linear combinations of the variable groups 1 and 2 by using the correlation matrix, i.e. to solve the maximization task by applying the eigenvector U and V related to the maximum eigenvalue of the matrix. This is expressed by $$\rho_1^* = \max_{a,b} Corr(U, V),$$

$$\hat{\rho}_1^{*2} = OA_1(R_{11}^{-1/2} R_{12} R_{22}^{-1} R_{21} R_{11}^{-1/2}),$$

where the maximum eigenvalue $OA_1$ of the matrix $R_{11}^{-1/2} R_{12} R_{22}^{-1} R_{21} R_{11}^{-1/2}$ equals a square $\hat{\rho}_1^{*2}$ of the canonical correlation corresponding to it. The following coefficient vectors are also formed $$\hat{a}_1 = \hat{e}_1' R_{11}^{-1/2}$$

and $$\hat{b}_1 = \hat{f}_1' R_{22}^{-1/2}$$

for calculating the canonical variables, the coefficient vectors being obtained by applying eigenvectors e and f corresponding to the maximum eigenvalues, provided that $\hat{f}_1$ is the eigenvector corresponding to the maximum eigenvalue of the matrix $R_{22}^{-1/2} R_{21} R_{11}^{-1} R_{12} R_{22}^{-1/2}$, and $$\begin{cases} \hat{U}_1 = \hat{a}_1^{*'} Z^{(1)} = a_1 Z_1^{(1)} + \ldots + a_p Z_p^{(1)} \\ \hat{V}_1 = \hat{b}_1' Z^{(2)} = b_1 Z_1^{(2)} + \ldots + b_p Z_p^{(2)} \end{cases}.$$

Here the canonical variables $U_1$ and $V_1$ correspond to the maximum canonical correlation. The variable z refers to standardized observations, the symbol ^ denotes that the variable in question is estimated and not necessarily the same as the theoretical value, and the symbol ′ denotes vector transpose.

The zero hypothesis $H_0$ at risk level $\alpha$ is then rejected if $$-\left(n - 1 - \frac{1}{2}(p + q + 1)\right) \ln \prod_{i=1}^{p} (1 - \hat{\rho}_i^{*2}) > \chi_{pq}^2(\alpha).$$

4) If the zero hypothesis $H_0$ is rejected, then the calculation of the linear combinations continues until the Likelihood Ratio test no longer provides statistically significant canonical correlations, i.e. the following are formed $$H_{0(k)}^{(k)}: \rho_1^* \neq 0, \ldots, \rho_k^* \neq 0, \rho_{k+1}^* = \ldots = \rho_p^* = 0$$

$H_1: \rho_i^* \neq 0$, at any values $i \geq k+1$.

This is the general form of hypothesis for the testing of subsequent correlations. For example, when the second canonical correlation is tested, the variable k=1, and when the third one is tested, k=2.

Now $H_0^{(k)}$ at risk level $\alpha$ is rejected if $$-\left(n - 1 - \frac{1}{2}(p + q + 1)\right) \ln \prod_{i=k+1}^{p} (1 - \hat{\rho}_i^{*2}) > \chi_{(p-k)(q-k)}^2(\alpha)$$

and $$\hat{U}_k = \hat{e}_k' R_{11}^{-1/2} z^{(1)}$$

$$\hat{V}_k = \hat{f}_k' R_{22}^{-1/2} z^{(2)}.$$

To facilitate the interpretation of the linear combinations their correlations with variable groups 1 and 2 can be calculated as follows:

$$\hat{A}_{p\times p} = \begin{pmatrix} \hat{a}_1' \\ \hat{a}_2' \\ \vdots \\ \hat{a}_p' \end{pmatrix} \text{ and } \hat{B}_{q\times q} = \begin{pmatrix} \hat{b}_1' \\ \hat{b}_2' \\ \vdots \\ \hat{b}_p' \end{pmatrix}, \text{ and wherein}$$

$$R_{\hat{U},x}(1) = \hat{A} R_{11} D_{11}^{-1/2}$$

$$R_{\hat{V},x}(2) = \hat{B} R_{22} D_{22}^{-1/2}$$

$$R_{\hat{U},x}(2) = \hat{A} R_{12} D_{22}^{-1/2}$$

$$R_{\hat{V},x}(1) = \hat{B} R_{21} D_{11}^{-1/2}$$

7) We can then check how well the r canonical variables we have calculated produce the original correlation matrix. Therefore we determine the following $$R_{11} - (\hat{a}_z^{(1)} \hat{a}_z^{(1)'} + \hat{a}_z^{(2)} \hat{a}_z^{(2)'} + \ldots + \hat{a}_z^{(r)} \hat{a}_z^{(r)'})$$

$$R_{22} - (\hat{b}_z^{(1)} \hat{b}_z^{(1)'} + \hat{b}_z^{(2)} \hat{b}_z^{(2)'} + \ldots + \hat{b}_z^{(r)} \hat{b}_z^{(r)'})$$

$$R_{12} - (\hat{\rho}_1^* \hat{a}_z^{(1)} \hat{b}_z^{(1)'} + \hat{\rho}_2' \hat{a}_z^{(2)} \hat{b}_z^{(2)'} + \ldots + \hat{\rho}_r^* \hat{a}_z^{(r)} \hat{b}_z^{(r)'}).$$

8) Lastly, it is worth while to check the portion of the total variance the r canonical variables we have calculated explain in their variable groups.

Canonical correlation analysis can be carried out according to a plurality of different estimation principles, and the process may involve two variable groups, or more. For example, information obtained from a cellular network could be used for forming three variable groups: radio parameters, measurements and alarm data. The analysis would then be used in an effort to model the dependencies between selected variable groups.

A conventional canonical correlation analysis is based on modelling the linear dependencies between the variable groups, as shown in FIG. 2. The conventional method was presented by H. Hotelling in 1935, and the maximization task involved in the method can be solved by applying eigenvalues and their eigenvectors, for example.

A non-linear canonical correlation analysis is based on replacing the original variables with optimally scaled variables that may also be non-linearly transformed. Optimal scaling is carried out by an iteration performed simultaneously with the actual maximization task and, depending on the number of the variable groups, the iteration can be carried out using either a CANALS or an OVERALS algorithm.

Canonical correlation analysis has not been utilized for controlling cellular network capacity, or even for analyzing the capacity. Capacity control demands quite a lot from the model it is based on. The above described model was chosen on the basis of the independence of the types and the orthogonal solutions, different methods of analysis providing widely differing classifications. Other methods also produce more complex models, but they are also much more complicated to utilize. Canonical correlation analysis can be carried out in various ways, and in non-linear canonical correlation analysis the transformation type of the variables may have a considerable impact on the results of the analysis.

The measures required by the method of the invention can be carried out by a system that advantageously comprises a processor equipment performing the method steps of the method by employing a suitable software. The processor equipment can be composed of a processor and separate logic components of memory circuits or a computer, for example.

Although the invention is described above with reference to an example according to the accompanying drawings, it is apparent that the invention is not restricted to it, but may vary in many ways within the inventive idea disclosed in the claims.

What is claimed is:

1. A method for calculating a model to be used for controlling cellular network capacity and for facilitating the control of the capacity, the method comprising:

generating of variable groups from cellular network variables determining of the interdependencies of the variable groups of the cellular network, searching the variable groups for linear combinations dependent on each other, the dependence between the linear combinations and the strength of the dependence being measured by applying a canonical correlation coefficient, and expressing a multidimensional dependence of two variable groups in pairs using only canonical variable pairs.

2. The method according to claim 1, wherein the variable groups formed of the cellular network variables comprise cellular network feed parameters and measurement results.

3. The method according to claim 1, wherein desired variable groups are selected to serve as cellular network variables.

4. The method according to claim 1, wherein the linear combinations of the variable groups in pairs are dependent on each other.

5. The method according to claim 4, wherein the linear combinations of the variable groups in pairs are dependent on each other and independent of other linear combinations.

6. The method according to claim 5, wherein the dependence between the linear combinations, or canonical variables, is calculated by applying a canonical correlation analysis, the canonical correlation analysis comprising:

arranging the material to be observed into matrix format;

carrying out any transformations needed on the variables having a distribution deviating from the standard distribution;

standardizing the variables;

calculating the correlations between the variables;

testing whether the correlations between the variable groups at a selected risk level show a deviation from zero;

forming the linear combinations of the variable groups on the basis of the correlation matrix;

calculating the correlations of the linear combinations with the variable groups; and determining to what extent the calculated canonical variables explain the total variance in their respective variable groups.

7. The method according to claim 1, wherein the dependencies of the variable groups are calculated using a numerical matrix calculation.

8. The method according to claim 1, wherein expressing a multidimensional dependence of two variable groups a is performed by applying various methods, depending on whether the dependencies between the variables are linear or non-linear.

9. A system for calculating a model to be used for controlling the capacity of a cellular network for facilitating the control of the capacity, the system being arranged to generate variable groups from the cellular network variables and to determine interdependence of the variable groups of the cellular network, wherein the system is arranged to search the variable groups for linear combinations dependent on each other, to measure the dependence between the linear combinations and the strength of the dependence by applying a canonical correlation coefficient, a multidimensional dependence of two variable groups being packed in pairs into canonical variable pairs.

* * * * *